Figure 1:
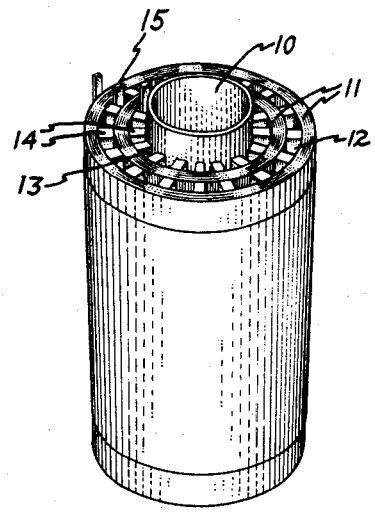

Oct. 25, 1960  A. G. JARVIE ET AL  2,958,059
TAP OR LEAD FOR FOIL WOUND ELECTRICAL APPARATUS
AND METHOD OF MAKING THE SAME
Filed May 15, 1958  2 Sheets-Sheet 1

Inventors,
Alexander G. Jarvie,
Lloyd M. Hall,
by Gilbert P. Tarleton
Their Attorney.

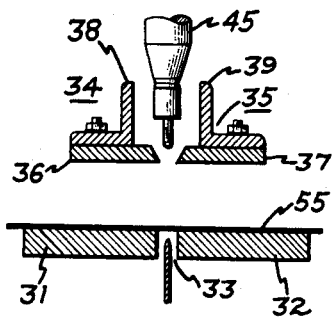 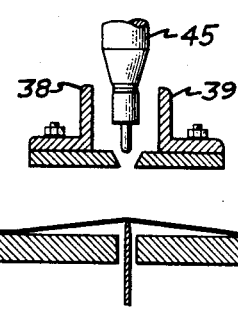 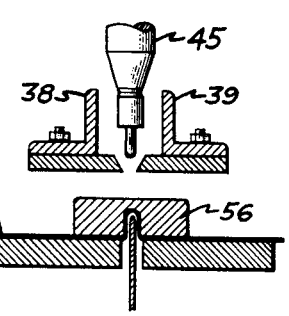
Fig. 3.  Fig. 4.  Fig. 5.
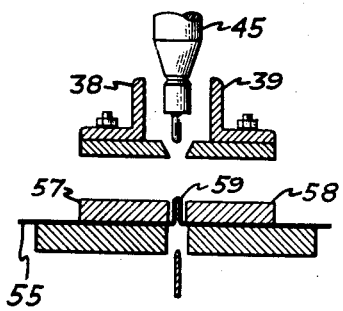 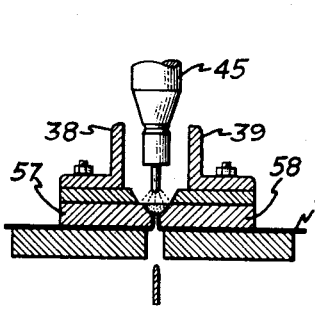 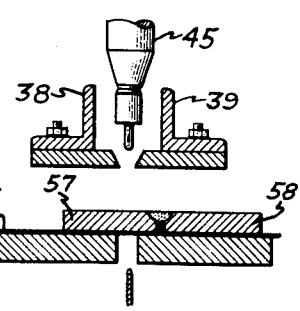
Fig. 6.  Fig. 7.  Fig. 8.
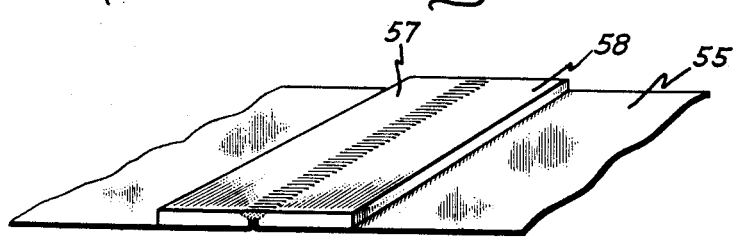
Fig. 9.

United States Patent Office 2,958,059
Patented Oct. 25, 1960

2,958,059

TAP OR LEAD FOR FOIL WOUND ELECTRICAL APPARATUS AND METHOD OF MAKING THE SAME

Alexander G. Jarvie, Washington, and Lloyd M. Hall, North Adams, Mass., assignors to General Electric Company, a corporation of New York Filed May 15, 1958, Ser. No. 735,629

5 Claims. (Cl. 336—192)

This invention relates to electrical apparatus, and more in particular to an improved tap or lead and method for making the same, for foil wound electrical apparatus. While it is usual to refer to a conducting member which terminates the winding as a "lead" and a conducting member attached to the winding at a point intermediate its ends as a "tap," henceforth when the term "tap" is employed it will be understood to also mean "lead."

Foil wound electrical apparatus are comprised of suitably insulated strip of conducting material flatwise wound upon itself so that each turn on the strip constitutes one complete layer of a coil. The axial length of the coil may be equal to the width of the strip. The thickness of the foil or strip may, for example, be up to about .060 inch, although for the purpose of the present invention the actual thickness of the foil is not material, the relative thinness of the foil in comparison with a tap being more significant.

While the tap connection of the present invention is particularly adaptable to electrical induction apparatus such as transformers, it may also be employed on other types of foil wound apparatus, such as capacitors, without departing from a spirit or scope of the invention.

Foil wound coils have been found to offer a number of advantages over conventionally wound coils for use in transformers. For example, foil wound coils are more easily wound and the space occupied by the coil is substantially reduced. The foil windings also have a greater mechanical strength to resist short circuit forces, and the foil configuration provides a more uniform inherent distribution of transient voltage stresses.

Considerable difficulty has arisen, however, in the provision of intermediate taps on foil windings, and previous tap connections have employed either mechanical contact or welding at localized points. Such methods have proven to be electrically inadequate for many applications. It is often essential that a metallurgical bond exist across the entire width of the strip conductor. For example, while mechanical contact has been successfully employed for tap connections on capacitor windings, this type of connection does not provide adequate electrical conductivity or suitable current distribution for transformer windings employing flat strip for the electrical conductor.

While electrical considerations suggest the use of a continuous weld between the tap conductor and coil strip, previous attempts to provide such a weld have been unsatisfactory. Since the thickness of the tap (e.g. 0.125 inch to 0.25 inch) is generally considerably greater than the thickness of the strip conductor (e.g. 0.0015 inch to 0.03 inch), difficulty has been experienced in accomplishing the weld without melting holes in the strip conductor, due to the large mass differential between the strip and tap.

In order to provide a satisfactory welded connection between the strip conductor and the tap lead, it is necessary that the welded joint does not create composite metal thicknesses appreciably greater than the original thickness of the unwelded components, in order that the space occupied by the foil winding is not materially increased. It is also necessary that the welded joint be completely free from corrosive fluxes, or other foreign matter, and that no foreign matter be introduced into the weld to promote a chemical composition leading to a reduction of electrical conductivity through the welded joint. Although with extreme care previous welding techniques may have been able to provide a weld satisfying these conditions, the time and skill required to produce them defeated the economical advantages of foil windings over conventional windings.

It is therefore an object of this invention to provide an improved tap connection for foil wound electrical apparatus.

It is also an object to provide an improved method for connecting taps to strip conductors of foil wound electrical apparatus.

It is a further object of this invention to provide a readily fabricated tap connection between a tap and foil winding, the tap connection being characterized in that it provides a continuous welded joint across the entire width of the conductor, the composite thickness of the welded joint is not appreciably greater than the original thicknesses of the unwelded components, and the joint is completely free from corrosive fluxes or other foreign matter so that no foreign matter is introduced into the weld to create a chemical composition leading to a reduction of electrical conductivity through the welded joint.

It is a further object to provide an improved method for providing a welded joint having the characteristics recited in the preceding paragraph.

Briefly stated, in accordance with one aspect of this invention, we provide a tap connection for foil wound electrical apparatus. The apparatus comprises a continuous conducting foil, and a transversely extending fold is provided in the foil intermediate the ends thereof. A pair of bar leads are provided extending parallel to the fold, and the foil of the fold is pinched between the bar leads. A continuous weld is provided joining the apex of the fold and the bar leads.

While the specification concludes with claims particularly pointing out and distinctly claiming the subject matter which we regard as our invention, it is believed that the invention may be better understood from the following description taken in connection with the accompanying drawings.

Figure 2:
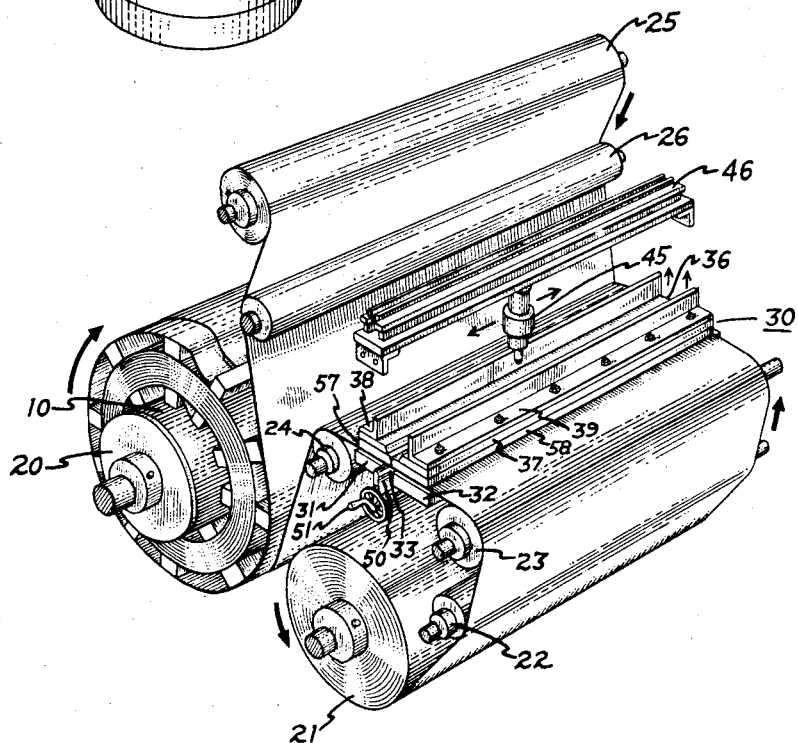

In the drawings:

Fig. 1 is a perspective view of a foil winding for a transformer, the winding having a tap lead which may be connected according to the present invention, Fig. 2 is a perspective view of typical apparatus for forming a foil winding and including means which may be employed to make the tap connection of the present invention, Figs. 3–8 are cross-sectional views of a portion of the apparatus of Fig. 2, and illustrating the steps in making the tap connection of the present invention, and Fig. 9 is a perspective view of a tap connection made in accordance with the present invention.

Referring now to the drawings, and more in particular to Fig. 1, therein is illustrated a foil wound transformer winding. The winding is comprised of a continuous strip of conducting material, such as aluminum foil, closely spirally wound about an insulating cylinder 10. Suitable insulation such as paper is provided between the turns of the winding, and the winding may be separated into a plurality of groups 11, separated by ducts 12 to facilitate cooling of the winding. A duct 13 may also be provided between the winding and the cylinder 10. Axially extending spacing members 14 are provided to maintain the dimensions of the ducts. One or more taps 15 may be provided on the coil, the taps preferably extending through the ducts in order to maintain the concentricity of the winding.

In order to fabricate the winding of Fig. 1, the winding cylinder 10 (see Fig. 2) is mounted on a mandrel 20 which may be driven by any suitable source of rotary motion. A supply roll 21 of conducting foil, such as aluminum foil, is provided and the foil is directed from the roll 21 to the winding by way of rollers 22, 23, and 24. The portion of the foil extending between the rollers 23 and 24 is preferably horizontal. A supply roll 25 of insulating material, such as paper, is also provided, and the insulating material is directed from the roll 25 to the winding by way of roller 26 such that the insulating material is interleaved with the turns of the conducting material to provide turn-to-turn insulation for the winding. The insulating material also preferably has greater width than the conducting material in order to increase the dielectric strength of the winding at its axial ends.

A welding clamp assembly, generally designated by the numeral 30, is disposed in the region between the rollers 23 and 24, and is comprised of a pair of parallel rigid fixed table members 31 and 32 disposed beneath the foil. The table members 31 and 32 extend transversely of the foil for at least the entire width of the foil, and are separated by a gap 33 also extending transversely of the foil. A pair of rigid vertically movable clamp members 34 and 35 are disposed above the foil in alignment with the members 31 and 32 respectively. The vertically movable clamp members may be comprised of elongated plates 36 and 37 respectively having substantially flat lower surfaces and bolted to elongated angle members 38 and 39 respectively of their upper surfaces to make the clamp members more rigid. As illustrated more clearly in Figs. 3–8, the members 36 and 37 are separated by a gap 40 in alignment with the gap 33 between the table members 31 and 32, and the gap 40 is preferably beveled so that it is wider away from the table members 31 and 32. The means for providing the vertical movement of members 34 and 35 has not been illustrated for the sake of clarity of the drawing, and it will, of course, be understood that any convenient means may be employed for this purpose.

Referring again to Fig. 2, an arc welding electrode 45 is positioned above the foil between the clamp members 34 and 35, and the electrode 45 is mounted on a track 46 for movement transversely of the foil in alignment with the gaps 40 and 33. The welding electrode 45 is also adapted for vertical movement by a suitable means (not shown in the drawing) to enable the electrode to be moved into and out of welding position with respect to the foil. It is preferred that the welding occur in an inert gas atmosphere in order to prevent oxidation of the foil and leads, and it is also preferred that the electrode be of the non-consumable type, as will be explained in more detail in the following disclosure.

Means such as a knife edge 50 disposed in the gap 33 between the members 31 and 32, is provided in order to form an indentation in the material. The knife edge 50 is vertically movable through the gap 33 by any convenient means such as a plurality of cams rotated by a crank 51. It will be obvious, of course, that other means may be provided in order to form an indentation in the foil.

Referring to Fig. 3, therein is illustrated a partially cross-sectional view of the welding assembly of the apparatus of Fig. 2 prior to the joining of taps to the foil. In this figure, the foil 55 is shown contacting the upper surface of the table members 31 and 32, the knife edge 33 is disposed beneath the foil 55 and the clamp members 34 and 35 and the welding electrode 45 are held substantially above the foil.

In order to form an indentation in the foil, the knife edge 33 is then raised to slightly deform the foil while the foil is in tension, as illustrated in Fig. 4, and a notched block 56 (Fig. 5) is manually or automatically pressed against or slid along the upper surface of the foil so that the foil conforms to the shape of the knife edge projecting above the table members 31 and 32, thereby forming a fold extending transversely across the foil. The knife edge 33 is then withdrawn from contacting relationship with the foil (Fig. 6) and the fold is pinched between the edges of a pair of coplanar tap leads 57 and 58, with the apex 59 of the fold projecting slightly above the upper surface of the tap leads.

The clamping members 34 and 35 are then lowered into contact relationship with the tap leads 57 and 58 respectively (Fig. 7) in order to firmly hold the taps in position during the welding operation. The welding torch 45 is then lowered into welding relation with respect to the tap leads and the fold in the foil, and the welding electrode is moved transversely across the foil, thereby welding the apex of the fold of the foil to the edges of the taps 57 and 58 so that the weld joins the foil to the taps and joins the taps together. The clamping members 34 and 35 and the welding electrode 45 are then withdrawn from the taps, as illustrated in Fig. 8, and the taps are wound into the winding as illustrated in Fig. 2.

In order that the surface of the weld be substantially smooth as illustrated in Fig. 9 and not project beyond the top surfaces of the taps, it is preferred that non-consumable welding electrodes be employed. By making the height of the fold of foil slightly greater than the thickness of the taps, the apex of the fold projects slightly above the top surfaces of such taps or leads as they are positioned prior to welding. In this manner the probability of weld metal forming a ridge projecting beyond the surfaces of the taps is reduced. As shown in Fig. 9, the region of the weld is confined to the upper portions of the taps and fold, so that lengthwise tensile forces on the foil do not act directly on the weld. This results in a stronger assembly, since the tensile forces do not act directly on the inherently weaker annealed strip immediately adjacent to the zone of fusion.

While the taps have been illustrated as being flat, it will be understood that these members may be slightly curved to conform to the shape of the coil, without departing from the spirit or scope of the invention.

It will be understood, of course, that, while the form of the invention herein shown and described constitutes the preferred embodiment of the invention, it is not intended herein to illustrate all of the possible equivalent forms or ramifications thereof. It will also be understood that the words employed are words of description rather than of limitation, for example, the use of the term "upper" relates only to the relative positions of the components as illustrated and not necessarily to their positions during fabrication or use. Similarly, while the invention has been disclosed with particular reference to pairs of bar leads, it shall be understood that other arrangements, such as a single bar lead having a longitudinal split for a distance equal to the width of the foil, may also be employed. Various changes may be made without departing from the spirit or scope of the invention herein disclosed, and it is aimed in the appended claims to cover all such changes as fall within the true spirit or scope of the invention.

What we claim as new and desire to secure by Letters Patent of the United States is:

1. A tap for foil wound electrical apparatus comprising a continuous conducting foil, a transverse fold extending across said foil, a pair of bar leads extending parallel to said foil, the foil of said fold being pinched between said bar leads, and a weld joining the apex of said fold and said bar leads.

2. A tap for foil wound electrical apparatus comprising a continuous conducting foil, a transverse fold of uniform height extending across said foil and having a lengthwise direction normal to the lengthwise direction of said foil, a pair of bar leads of substantially rectangular cross section extending parallel to said fold, the foil of said fold being pinched between the edges of said bar leads, and a continuous weld joining the apex of said fold and said bar leads.

3. A tap for foil wound electrical apparatus comprising a continuous conducting foil, a transverse fold of uniform height extending across said foil and having a lengthwise direction normal to the lengthwise direction of said foil, a pair of bar leads of substantially rectangular cross section extending parallel to said fold, the foil of said fold being pinched between the edges of said bar leads, the height of said fold being slightly greater than the thickness of said bar leads, and a weld joining the apex of said fold and said bar leads, the surface of said weld being substantially coplanar with the adjacent surfaces of said bar leads.

4. A winding for stationary electrical induction apparatus comprising a continuous spiral wound insulated conducting foil arranged to form a plurality of concentric group of tightly wound groups of turns separated by axially extending annular ducts, and at least one tap extending from said duct and welded to said foil, said tap comprising a pair of bar shaped leads parallel to the axis of said groups, and arranged in edge to edge relationship, an axially extending fold of uniform height in said foil, said fold extending into said duct and being pinched between the edges of said bar leads, and an axially extending weld joining the apex of said fold and said bar leads.

5. A winding for stationary electrical induction apparatus comprising a continuous spiral wound insulated conducting foil arranged to form a plurality of concentric group of tightly wound groups of turns separated by axially extending annular ducts, and at least one tap extending from said duct and welded to said foil, said tap comprising a pair of bar shaped leads parallel to the axis of said groups, and arranged in edge to edge relationship, an axially extending fold of uniform height in said foil the height of said fold being slightly greater than the thickness of said bar leads, said fold extending into said duct and being pinched between the edges of said bar lead so that one surface of each bar lead lays against the unfolded portion of said foil, and an axially extending weld joining said bar leads together and joining the apex of said fold and said bar leads, the surface of said weld being substantially coplanar with the opposite surfaces of said bar leads.

References Cited in the file of this patent

UNITED STATES PATENTS

| | | |
|---|---|---|
| 2,206,375 | Swift | July 2, 1940 |
| 2,339,067 | Franz | Jan. 11, 1944 |
| 2,406,961 | Nichol | Sept. 3, 1946 |